Nov. 15, 1938.   A. ARMOUR   2,136,407
SEAT CABINET FOR AUTOMOBILES
Filed Oct. 12, 1937
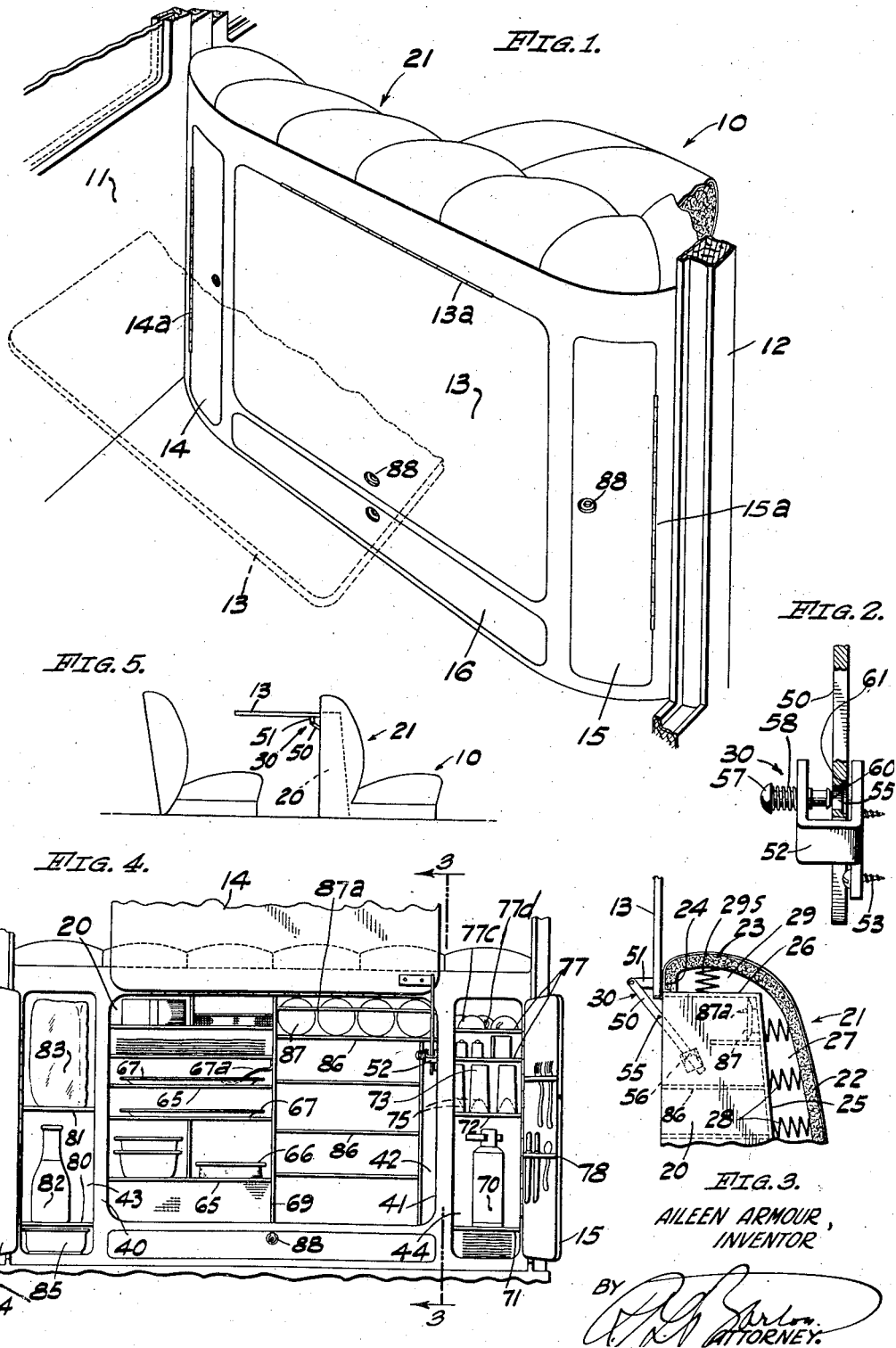
AILEEN ARMOUR, INVENTOR Patented Nov. 15, 1938

2,136,407

UNITED STATES PATENT OFFICE 2,136,407

SEAT CABINET FOR AUTOMOBILES

Aileen Armour, Los Angeles, Calif.

Application October 12, 1937, Serial No. 168,602

1 Claim. (Cl. 155—123)

This invention pertains to a seat back construction.

An important object of the invention is the utilization of a portion of the rear space in a seat back and the back covering such space for a useful purpose in addition to that which pertains to the part it plays in the structure of the seat.

A further object of the invention is providing a compartment in a seat back for housing articles adapted to be removed and placed upon a cover or door enclosing such compartment when said door is adjusted to a supporting position with relation to the seat, for such articles.

A still further object of the invention resides in a more substantial way of constructing seat backs, wherein the strength of the back is increased and a new and advantageous manner of applying the upholstery is realized.

Yet a further object resides in providing a strong backing for attaching safety means in seats of moving vehicles and the like, wherein shiftable articles placed in a compartment afforded by said backing may be restrained from moving when such seats are subjected to the jolts resulting from travel over uneven road beds and hence the articles are subjected to jostling.

An important general object resides in providing a seat back with a compartment and a cover for the compartment adapted for use as a table top for an occupant of such seat, and of a seat located rearwardly thereof.

Other objects, advantages and features of invention will hereinafter appear.

Referring to the accompanying drawing which illustrates what is at present deemed to be a preferred embodiment of the invention, Fig. 1 is a perspective view of an interior portion of an automobile body and seat illustrating from the rear a seat back equipped with the invention.

Fig. 2 is a side elevation of a device for controlling the main door of the cabinet, more particularly with regard to the open and closed positions of said door.

Fig. 3 is a fragmentary sectional view of the upper portion of the seat back and cabinet therein, and main door of the cabinet therein, the main door of the cabinet being shown maintained in its fully open position by means of the device detailed in Fig. 2. This view is taken on the plane indicated by the line 3—3 of Fig. 4.

Fig. 4 is a rear view of the cabinet, looking into the various compartments thereof, all of the cabinet doors being open.

Fig. 5 is a diagrammatic view showing two seats adjacent to each other the back of the front seat being equipped with the invention.

Referring in detail to the drawing, in Fig. 1 a seat structure 10 is shown which extends across the space between the side walls 11 and 12 (fragments of which are shown in this view) of the body of an automobile, and the position of the cabinet in said seat structure is indicated by the position of the main cabinet door 13, its side doors 14 and 15 and its extensible drawer portion 16 which underlies said main door 13. Said doors form a part of a cabinet 20 which extends substantially from end to end of the seat back 21. Said seat back has an upholstered front portion 22 and upholstered top portion 23. The latter upholstered portion terminates along its rear side in a downwardly directed ledge 24.

The casing of the cabinet 20 is furnished with a back wall 25 and a top wall 26. Between said wall 25 and the upholstered portion 22 of the seat back intervenes a space 27 wherein are located the upholstery springs 28, while in the space 29 above the top cabinet wall 26 are springs 29s which support the upholstery 23 along the top of the seat back. It will, therefore, be seen that the casing of the cabinet not only forms a housing for articles contained therein but it also furnishes an abutment for the inner ends of the upholstery springs.

The main door 13 of the cabinet is attached along its upper edge, and adjacent to the top of the seat back 21, by hinges 13a. When swung to its open, upstanding position shown in Figs. 3 and 4 said door is releasably maintained in this position by the locking device detailed in Fig. 2. In this upstanding position it permits an entirely unobstructed access to all the articles within the cabinet, for persons occupying the rear seat, even tho some of said articles are located within a space adjacent to the top of said seat back 21.

As viewed in Fig. 4, near the left end of the cabinet is an upwardly and downwardly extending partition 40, and near its right end is a like partition 41. By these partitions the interior of the cabinet is divided into a main central compartment 42, and the smaller, auxiliary end compartments 43 and 44.

The door 14 of the left compartment is furnished at its outer edge with hinges 14a (Fig. 1) which are attached to approximately the extreme end portion of that part of the seat back, while the opposite end door 15 is similarly attached by hinges 15a.

The device 30 for supporting the main door 13 in its various positions comprises a rod 50 which is pivotally connected with an arm 51 carried by said door. Said rod 50 slides through a yoke-shaped keeper 52 which is secured, for example by means of screws 53, to one of the end walls of the cabinet. Said rod 50 is furnished with the adjustment apertures 55 and 56, and one limb of the keeper yoke 52 is apertured to receive a locking pin 57 yieldingly held in an inoperative position by a spring 58, except when manually operated in opposition to said spring. Said pin 57 has at its inner end a head or flange 60, and when the pin is pressed into its operative position said flange will catch back of the annular shoulder 61 at the right hand side of said aperture 55 (or 56) as viewed in Fig. 2, thereby supporting the door 13 in its adjusted position. The device 30 is capable of supporting the door 13 in a substantial manner in the horizontal position wherein it is used as a table top. When thus used it will support edibles within easy reach of occupants not only of the rear seat but of the front seat also.

The main central compartment of the cabinet is shown divided at its mid-length by a vertical partition 69. Within the left central portion of the cabinet are shown shelves 65 to support the utensils 66, plates 67 and other articles according to the preference of the user. Said plates are shown held in place behind a spring arm 67a.

As shown in Fig. 4, in the right hand compartment is a thermos bottle 70 on a shelf 71 and above this is a shelf 72 which supports inverted glasses 73 which are held in place by means of the upwardly directed projections 75 carried by said shelf. Still other shelves 77 are shown higher up in this compartment to support other articles, among them cups 77c held in place by keepers 77d. The door of this compartment has horizontal interior apertured strips 78 adapted to support knives, forks and spoons as shown. At the opposite end of the cabinet are shown shelves 80 and 81 which, respectively, support the bottle 82 and bread 83, while below the shelf 80 is shown a wash basin 85. Articles most frequently used on the table top afforded by the main door 13 should be stored in the two end compartments of the cabinet whence they may be conveniently transferred to the table provided as aforesaid whenever a meal is eaten therefrom.

Within the right central portion of the cabinet are shown shelves 86 to support the plates 87 and other utensils if desired. Said plates are shown held in place behind a rod 87a.

The extensible drawer 16, side doors 14 and 15 and main door 13 are manually operable by means of handles 88 of the lift out and pull type.

The shelves shown within the cabinet may be removed and the general arrangement of the interior supporting means altered to suit various requirements. The illustrated embodiment is more particularly intended for the use of travelers or of people seeking pleasure away from home.

It should be understood that the present disclosure is for the purpose of illustration only and that this invention includes all modifications and equivalents which fall within the scope of the subject matter claimed.

What is claimed is:

The combination, with a vehicle seat back having a compartment in the rear portion thereof; of a door for said compartment, hinges whereby said door is hinged to said seat back adjacent to the top thereof to swing from a pendant to a horizontal position, a yoke-shaped keeper mounted within said compartment, one limb of said yoke having an aperture, and a rod provided with a plurality of apertures, each having an annular shoulder, pivotally secured to said door, said rod sliding through said keeper as said door swings, and releasable stop means operatively related to said rod to releasably maintain said door in various adjusted positions, in one of which positions it forms a table top, said stop means comprising a locking pin having a head, a spring yieldingly holding said pin in an inoperative position in relation to said aperture of said limb, except when manually operated in opposition to said spring, said pin being manually operable to engage said head in a locking engagement with the annular shoulder of said aperture.

AILEEN ARMOUR.